June 16, 1953  B. E. RICKS  2,642,318
BEARING ASSEMBLY
Filed Feb. 25, 1950
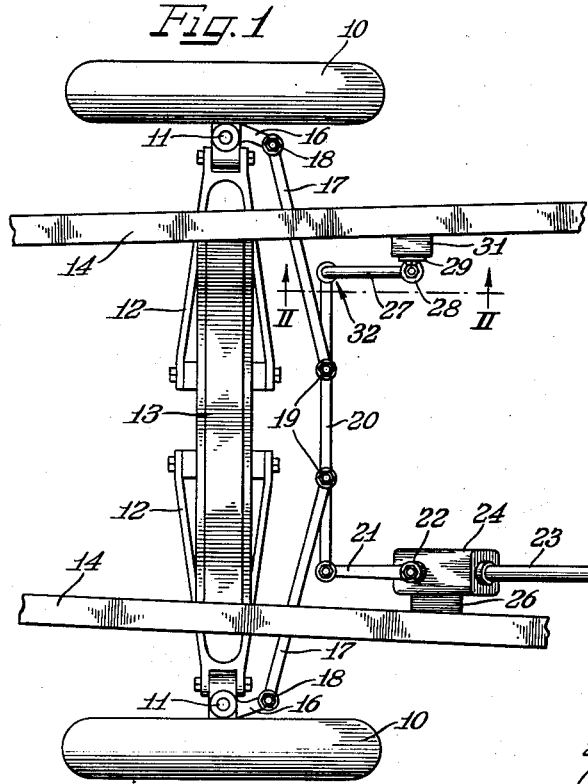
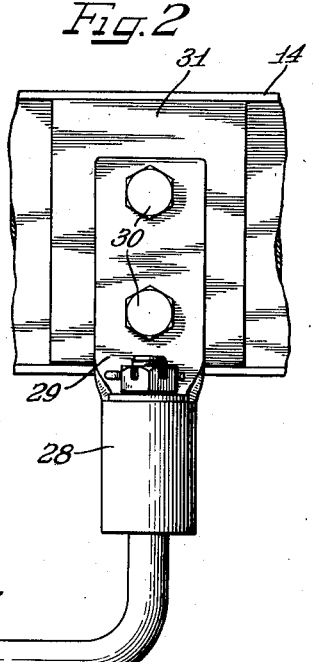
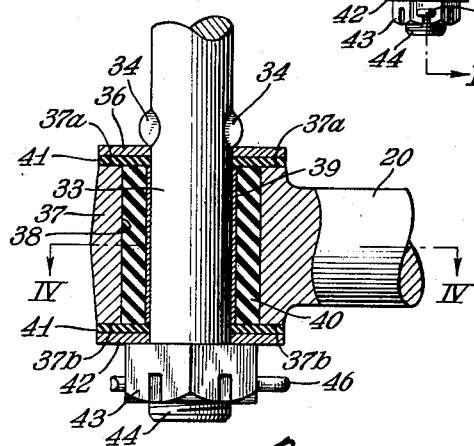
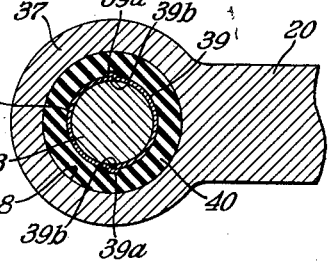
Inventor
Bernard E. Ricks
by *[signature]* Attys Patented June 16, 1953

2,642,318

UNITED STATES PATENT OFFICE 2,642,318

BEARING ASSEMBLY

Bernard E. Ricks, Detroit, Mich., assignor to Thompson Products, Inc., Cleveland, Ohio, a corporation of Ohio Application February 25, 1950, Serial No. 146,196

4 Claims. (Cl. 308—26)

This invention relates generally to a bearing and more particularly to a novel joint assembly in which a cushion coupling joint is provided to accommodate angular movement between relatively displaceable elements.

According to the general features of the present invention, a segmented bearing is provided comprising a plurality of cylindrical segments which define overlapping nested mating edge portions to provide full bearing engagement with an angularly displaceable member when assembled in surrounding relationship thereto. An elastic sleeve is employed to retain the cylindrical segments in assembly and to normally urge such segments radially inwardly into bearing engagement with the angularly displaceable member.

The material employed in the cylindrical segments may be impregnated with a suitable lubricant, thus avoiding the necessity of providing additional servicing lubrication in the operation of the joint. Furthermore, the segmented bearing will permit the angularly displaceable member to assume some angularity due to misalignment of the joint components since the segments of the bearing will relocate themselves and always maintain a close contact with the angularly displaceable member under the influence of the elastic sleeve.

In addition, if wearing occurs on the inner surface of the bearing segment, the elastic sleeve will urge the segments into bearing engagement with the angularly displaceable member thereby continually accommodating the effect of wear in the joint.

It is, therefore, an object of the present invention to provide a joint assembly operative as a bearing to permit relative angular movement between the components thereof which will accommodate misalignment of the joint components.

Another object of the present invention is to provide a bearing assembly which will continually effect adjustment of the joint components resulting from wear.

A further object of the present invention is to provide a self-adjusting pin joint assembly which does not require additional servicing lubrication.

Another object of the present invention is to provide a pin joint assembly which will operate efficiently and accommodate unusually large manufacturing tolerances.

A further object of the present invention is to provide a pin joint assembly which may be conveniently fabricated from simplified elements which may be economically produced.

Many other features, advantages and additional objects of the present invention will become manifest to those versed in the art upon making reference to the detailed description which follows and the accompanying sheet of drawings, in which:

Figure 1 is a fragmentary top plan view of an automobile chassis having a parallelogram-type steering linkage which employs link elements interconnected by a pin joint assembly according to the present invention;

Figure 2 is an enlarged fragmentary elevational view with parts shown in vertical cross-section taken on line II—II of Figure 1 showing the idler arm assembly of the linkage shown in Figure 1 equipped with a pin joint assembly according to the present invention;

Figure 3 is an enlarged fragmentary cross-sectional view with parts shown in elevation taken on line III—III of Figure 2; and Figure 4 is an enlarged fragmentary cross-sectional view taken on line IV—IV of Figure 3.

As shown on the drawings:

It will be understood that the principles of the present invention are applicable to any bearing type joint employed to provide a cushioned coupling between interconnected elements which move angularly with respect to one another.

For purposes of clarity in explanation and understanding the principles of the present invention are described in connection with their application to a steering linkage assembly in which the bearing assembly of the present invention may be used as a pin joint, or joints to connect various links to one another and to the frame part of an automobile.

Referring first to Figure 1, a pair of wheels 10, 10 of a dirigible vehicle are shown supported on stub-axles (not shown) and pivoted on king pins 11, 11. The wheels are supported by wheel arms 12, 12 from a transverse beam 13 of a vehicle frame which also includes side beams 14, 14.

A pair of steering arms 16, 16 extend rearwardly from the stub-axle assemblies of the wheels 10, 10 and are pivotally connected to a pair of tie rods 17, 17 through a ball and socket type joint 18, 18.

The tie rods 17, 17 extend inwardly and are pivotally secured by means of a ball and socket type joint 19, 19 to a cross link 20, which, in turn, is pivotally connected at one end to a pitman arm 21 suspended on a rock shaft 22 selectively rotatable by a steering column 23 through a gear box 24 affixed to the side beam 14 adjacent thereto or to a suitable protuberance 26 appended to the side beam 14.

In order to support the steering linkage in proper geometric relationship and in order to properly transmit a steering load to a change of direction, an idler arm 27 supported at one end by a bearing 28 and connected thereby to a bracket 29 provides a movable joint between the other end of the cross link 20 and one of the side beams 14 of the vehicle frame. As shown in the drawings, the bracket 29 is secured to the side beam 14 by a plurality of fasteners 30 or to a suitable protuberance 31 appended to the side beam 14.

Referring more specifically to Figures 2, 3 and 4, the bearing structure of the present invention is indicated generally by the reference numeral 32 and is shown employed as a pin joint connecting the free end of the cross link 20 to one end of the idler arm 27.

The pin or journal of the bearing assembly 32 in this particular embodiment comprises one arm portion of the generally crank-shaped idler arm 27. In order to promote clarity of understanding with respect to the general utility of the bearing assembly 32, the pin or journal portion of the idler arm 27 is designated in Figures 3 and 4 and will be referred to hereinafter in connection with a separate reference numeral 33.

The pin or journal 33 is preferably made from a bar of formed metal or ordinary commercially available cold rolled bar stock and is provided with a stop along the length thereof as indicated by the reference numeral 34. The stop 34 may be formed by hollow milling a ledge on the pin or journal 33 or by upsetting a boss in a pressing operation or, as shown in the preferred illustrated embodiment, by pinching the pin or journal to provide a pair of cold formed ears against which a washer-type thrust element and retainer 36 is seated.

The bearing block for the bearing assembly 32 is defined by a housing 37 such as might appear on the end of a link in a steering linkage or on a bracket intended to couple a linkage element to a fixed supporting member such as an automobile frame. The housing 37 may be forged, stamped, or cast directly into such a configuration as defines a bearing block portion with a bore 38 extending therethrough.

In this preferred embodiment, the housing 37 is shown as an integral portion of the cross link 20. Since the cross link 20 must be retained in a predetermined plane of movement, the housing 37 is also provided with bearing end faces indicated by the reference characters 37a and 37b (Figure 3).

The bearing of the bearing assembly 32 is a segmented sleeve comprising a plurality of cylindrical segments 39, 39 which together extend through more than 360° of circular arc, each of the segments 39, 39 having overlapping nested mating edge portions to permit the segments to develop a circular bore when in assembled relationship with one another thereby permitting full bearing engagement with the pan or journal when assembled in surrounding relationship thereto.

In the preferred embodiment herein described, a pair of segments 39 curved through a circular arc of more than 180° are provided and each of the segments is provided with an offset margin 39a, 39a which is offset radially outwardly to overlap an adjoining edge 39b of the segments 39 in mating relationship thereto. In such a manner, the offset margins 39a, 39a define a nest for receiving the adjoining edge portions 39b, 39b of the segments 39.

The segments 39, 39 are preferably made of a metal which is impregnated with a lubricant or, if desired, the segments 39 may be fabricated from an ordinary metal and coined on their inner surfaces to provide lubricant holding cavities. It may be noted that because of the relatively thin section defined by the segments 39, the segments 39 may be made from lubricant-impregnated material very economically because of the low total volume thereof.

The segments 39 are surrounded and retained by an elastic tube 40 which is preferably made of a rubber or rubber-like material. If the segments 39 are impregnated with a lubricant, it will be apparent that the bearing assembly 32 need not be serviced with additional lubrication and hence the elastic tube 40 may be made of a crude rubber stock. If the bearing assembly 32 requires lubrication, the elastic tube 40 may be made of an oil resistant synthetic elastomer such as "neoprene" or the like.

The pin or journal 33 together with the segments 39, 39 and the elastic tube 40 are placed in mating relationship with respect to the bore 38 of the housing 37. A pair of thrust washers 41, 41 preferably made of an anti-friction resilient material such as a lubricant-impregnated rubber or rubber-like substitute are employed on either side of the housing 37 in abutment to the bearing end faces 37a and 37b to provide a seal against the entry of dust and moisture into and between the bearing surfaces of the bearing assembly 32 and to provide a bearing surface for thrust forces imparted to the component elements of the assembly 32.

A second washer-like thrust element 42 may be placed in abutting relationship to the outermost thrust bearing 41 and the entire bearing assembly 32 may be retained in fixed axial position on the pin or journal 33 by a retainer means which includes a nut 43 threadable on a threaded stem portion 44 on the end of the pin or journal 33, the nut 43 being locked in selected axial position by a cotter pin 46.

Because the bearing of the bearing assembly 32 comprises a plurality of separated segments 39 which are resiliently urged by the elastic tube 40, misalignment of the bearing assembly components is accommodate because the bearing segments 39 will relocate themselves, always maintaining close bearing engagement with the pin or journal 33.

Moreover, if the inner surfaces of the bearing segments 39 are worn away due to the movement of the pin or journal 33, the elastic tube 40 will continually urge the bearing segments 39 radially inwardly into bearing engagement with the pin or journal 33 since the bearing segments 39 are capable of assuming a smaller diametrical cross-section because of their overlapped relationship.

It should be noted, in addition, that the overlapped nested edge portions of the bearing segments 39 prevent the elastic tube 40 from extruding between the bearing segments to the inner cylindrical bearing surface.

The resilient characteristics of the elastic tube 40 and the thrust bearing 41—41 provide a cushioned coupling between the pin or journal 33 and the housing 37, thereby substantially precluding the transmittal and magnification of rattling noises or other undesirable noises which may arise in portions of the mechanisms to which the bearing components are attached.

Although various minor modifications to the preferred embodiment shown and described herein by way of illustrative example only might occur to persons skilled in the art, it should be clearly understood that I wish to embody within the scope of this patent all such modifications as reasonably and properly come within the scope of my contribution to the art.

I claim as my invention:

1. In a joint assembly of the type having an angularly displaceable member and a housing, a segmented bearing comprising a plurality of similar separable mated cylindrical segments, one edge portion of each segment being offset radially outwardly to overlap an adjoining edge portion of a corresponding mating segment and an elastic resilient tube between the bearing and the housing normally urging the segments of the bearing into full bearing engagement with the angularly displaceable member.

2. In a joint assembly of the type having a pin angularly movable relative to a housing, a segmented bearing comprising a pair of similar separable cylindrical segments curved through a circular arc of more than 180 degrees, one of the edge portions of each of these segments being constructed to provide a nest for receiving the other of the edge portions of a corresponding mating segment, and an elastic resilient tube between the bearing and the housing normally urging the segments of the bearing into full bearing engagement with the pin.

3. A joint assembly comprising, a housing, a pin angularly movable in said housing, a segmented bearing comprising a plurality of similar separable cylindrical segments having mating overlapping edge portions and together completely surrounding a portion of the pin, each segment having one edge portion offset to provide a nest for receiving the edge portion of a corresponding segment adjacent thereto, and an elastic tube between the segmented bearing and the housing urging the segments of the bearing into full bearing engagement with the pin and resiliently supporting and journalling said pin in said housing.

4. A joint assembly comprising, a housing, a pin angularly movable in said housing, a segmented bearing comprising a plurality of similar separable cylindrical segments having mating overlapping edge portions and together completely surrounding the portion of the pin in said housing, each segment having one edge portion offset to provide a nest for receiving the adjacent edge portion of a corresponding segment, an elastic tube between the bearing and the housing urging the segments of the bearing into full bearing engagement with the pin and resiliently supporting said pin in said housing, a pair of thrust washers made of resilient lubricant-impregnated material on opposite sides of the housing and encircling the pin to seal the bearing surfaces of the joint, and retaining means between the pin and the housing to secure the joint in assembly and to preclude relative axial movement between the pin and the joint components.

BERNARD E. RICKS.

References Cited in the file of this patent

UNITED STATES PATENTS

| Number | Name | Date |
| --- | --- | --- |
| 698,378 | Demarest | Apr. 22, 1902 |
| 1,985,781 | Hufferd | Dec. 25, 1934 |
| 2,238,197 | Watson | Apr. 15, 1941 |
| 2,449,662 | Leeson | Sept. 21, 1948 |

FOREIGN PATENTS

| Number | Country | Date |
| --- | --- | --- |
| 772,900 | France | Aug. 20, 1934 |